United States Patent
Toyama et al.

(10) Patent No.: US 9,022,587 B2
(45) Date of Patent: May 5, 2015

(54) VEHICLE MIRROR DEVICE

(71) Applicant: Kabushiki Kaisha Tokai-Rika-Denki-Seisakusho, Aichi-ken (JP)

(72) Inventors: Hiroyuki Toyama, Aichi-ken (JP); Shigeki Yoshida, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 263 days.

(21) Appl. No.: 13/675,505

(22) Filed: Nov. 13, 2012

(65) Prior Publication Data

US 2013/0120865 A1    May 16, 2013

(30) Foreign Application Priority Data

Nov. 15, 2011    (JP) .................................. 2011-249954

(51) Int. Cl.
*G02B 7/182* (2006.01)
*B60R 1/06* (2006.01)
*B60R 1/076* (2006.01)

(52) U.S. Cl.
CPC .. *B60R 1/06* (2013.01); *B60R 1/076* (2013.01)

(58) Field of Classification Search
CPC ............ B60R 1/02; B60R 1/06; B60R 1/064; B60R 1/066

USPC .................................. 359/841, 871, 872, 877
See application file for complete search history.

(56) References Cited

U.S. PATENT DOCUMENTS 6,022,113 A    2/2000  Stolpe et al.
6,322,221 B1 *  11/2001  van de Loo .................... 359/877

FOREIGN PATENT DOCUMENTS

JP    2002-187483    7/2002

* cited by examiner

*Primary Examiner* — Euncha Cherry
(74) *Attorney, Agent, or Firm* — Roberts Mlotkowski Safran & Cole P.C.

(57) ABSTRACT

In a vehicle door mirror device, when a fitting recess portion and a fitting protrusion portion fit, a gap is formed between an orthogonal face and an opposing face due to a fitting recess portion and a fitting protrusion portion contacting along case rotating direction. Accordingly, even when the fitting protrusion portion wears and external shape becomes smaller, the fitting recess portion and the fitting protrusion portion are contacted and fitted until the gap disappears. The gap is set larger than a gap between a visor and a stay. Therefore, the fitting recess portion and the fitting protrusion portion contact along the case rotating direction even when the visor contacts the stay, due to presence of the gap. Accordingly, even when the visor contacting the stay is taken as useful life indicator of the device, rattling of the visor against the stay can be suppressed at this stage.

11 Claims, 6 Drawing Sheets

VEHICLE MIRROR DEVICE

CROSS-REFERENCE TO RELATED APPLICATION

This application claims priority under 35 USC 119 from Japanese Patent Application No. 2011-249954 filed Nov. 15, 2011, the disclosure of which is incorporated by reference herein.

BACKGROUND OF THE INVENTION

1. Field of the Invention

The present invention relates to a vehicle mirror device that is provided to a vehicle.

2. Description of the Related Art

In a manually storable-type door mirror device disclosed in Japanese Patent Application Laid-Open (JP-A) No. 2002-187483, a bracket is rotatably supported by a support shaft of a stand fixed to a stay, and a mirror portion (a housing member) is joined to the bracket. The mirror portion is accordingly configured such that it can turn between a use position and a storage position.

The stand is provided with a stand side opposing face, with a protrusion portion provided protruding from the stand side opposing face. The bracket is provided with a bracket side opposing face, with a recess portion formed to the bracket side opposing face. In the use position or the storage position of the mirror portion, the bracket side opposing face and the stand side opposing face are in contact with each other, with the protrusion portion being fitted to the recess portion in a state of mutual contact between the recess portion and the protrusion portion. The fitted state between the protrusion portion and the recess portion is released when the mirror portion is rotated from the fitted state of the protrusion portion and the recess portion, imparting a detent sensation to the mirror portion.

However, in the above manually storable-type door mirror device, when the mirror portion is rotated between the use position and the storage position, the protrusion portion is always sliding on the recess portion and the bracket side opposing face, so there is a possibility of wear to the protrusion portion. If the protrusion portion wear down, rattling of the mirror portion against the stay may occur, due to the bracket side opposing face contacting the stay side opposing face whilst the recess portion and the protrusion portion no longer make contact with each other in the use position or the storage position of the mirror portion. Therefore in the manually storable-type door mirror device above, wear of the protrusion portion is suppressed by manufacturing the stand from metal.

A structure is therefore desirable wherein rattling of a mirror portion against a stay can be suppressed from occurring even suppose a protrusion portion wears due to the mirror portion being rotated repeatedly.

SUMMARY OF THE INVENTION

In consideration of the above circumstances, the present invention is to provide a vehicle mirror device that can suppress the occurrence of rattling of a housing member against a stay even when a protrusion portion wears.

A vehicle mirror device of a first aspect includes: a support member that is fixed to a stay assembled to a vehicle body and that includes a support shaft; a rotating body that is rotatably supported at the support shaft; a housing member that houses an outer mirror, the housing member being joined to the rotating body, and being disposed such that a first gap is formed between the housing member and the stay in an upper and lower direction; a detent imparting section that imparts a detent sensation (feeling) to the housing member when the rotating body rotates, the detent imparting section being provided at the support member and the detent imparting section including an orthogonal face disposed in a direction orthogonal to the support shaft, and a protrusion portion protruding upwards from the orthogonal face; and a detent imparted section that is provided at the rotating body and that includes an opposing face disposed above the orthogonal face and facing the orthogonal face, and a recess portion provided at the opposing face and configured to be capable of fitting with the protrusion portion, wherein a second gap is formed between the orthogonal face and the opposing face due to the recess portion and the protrusion portion being in contact with each other along a rotating direction of the rotating body when the recess portion is fitted with the protrusion portion, and the second gap is set larger than the first gap.

In the vehicle mirror device of the first aspect, the support member is fixed to the vehicle body attached stay, and the rotating body is supported at the support shaft of the support member so as to be capable of rotating. The housing member housing the outer mirror is joined to the rotating body. The housing member is accordingly configured so as to be capable of rotating about the support shaft. The housing member can therefore turn (rotate) for example among a forward folded position at which position it is disposed towards the vehicle front in an emergency, a use position at which position the outer mirror is disposed facing towards the vehicle rear, and a storage position at which position the outer mirror is disposed facing the vehicle side. The first gap is formed in the upper and lower direction between the housing member and the stay.

The support member is provided with the detent imparting section. The detent imparting section includes the orthogonal face disposed in a direction orthogonal to the support shaft, and the orthogonal face is provided with the protrusion portion protruding upwards from the orthogonal face.

The detent imparted section is provided at the rotating body. The detent imparted section is provided with the opposing face at a position above the orthogonal face and facing the orthogonal face. At the opposing face, the recess portion is formed, the recess portion configured so as to be capable of fitting with the protrusion portion. A detent sensation can accordingly be imparted to the housing member through the rotating body by making configuration such that by rotating the rotating body the fitting state between the recess portion and the protrusion portion is released and the protrusion portion sliding over the inner peripheral face of the recess portion and over the opposing face.

There might have been a possibility of protrusion portion wear through repeated (many times) sliding of the protrusion portion over the inner peripheral face of the recess portion and over the opposing face. Suppose the protrusion portion wears down, there may be a possibility of rattling occurring between the recess portion and the protrusion portion when the recess portion fits with the protrusion portion due to the smaller external shape of the protrusion portion.

However, in this aspect, when the recess portion fits with the protrusion portion, the second gap is formed between the orthogonal face and the opposing face due to the recess portion and the protrusion portion contacting each other in the rotating body rotating direction. Accordingly, even supposing the protrusion portion wears and the external shape of the protrusion portion becomes smaller, the recess portion still fits with the protrusion portion with the recess portion and the protrusion portion in a mutually contacting state in the rotating body rotating direction until the second gap disappeared (until the opposing face contacts the orthogonal face). Rattling of the housing member against the stay can accordingly be suppressed from occurring at an early stage.

Suppose the protrusion portion wears and the second gap becomes smaller, the first gap also becomes smaller (the housing member gets closer to the stay) since the housing member is joined to the rotating body. In this aspect, the second gap is set larger than the first gap. Therefore, even suppose there is a large amount of wear to the protrusion portion so the housing member ultimately making contact with the stay (the first gap disappears), the recess portion and the protrusion portion still mutually contact each other along the rotating body rotating direction due to the second gap formed between the opposing face and the orthogonal face. Accordingly, in a case where, for example, the housing member contacting the stay is taken as an indicator of the useful life of the vehicle mirror device, rattling of the housing member against the stay can still be suppressed at this stage since the recess portion and the protrusion portion are still in mutual contact in the rotating body rotating direction at this stage.

It is possible in the first aspect that the protrusion portion is configured to include a pair of protrusion portion sloping faces; the recess portion is configured to include a pair of recess portion sloping faces; and the pair of protrusion portion sloping faces and the pair of recess portion sloping faces are formed such that boundary portions which are between the recess portion sloping faces and the opposing face make contact with the protrusion portion sloping faces respectively when the recess portion is fitted with the protrusion portion.

It is possible in the first aspect that the protrusion portion is configured to include a pair of protrusion portion sloping faces; the recess portion is configured to include a pair of recess portion sloping faces; and a dimension between boundary portions which are between the pair of recess portion sloped faces and the opposing face is set smaller than a dimension between boundary portions which are between the pair of protrusion portion sloping faces and the orthogonal face.

A vehicle mirror device of a second aspect is the vehicle mirror device of the first aspect wherein: the protrusion portion is configured to include a pair of protrusion portion sloping faces, sloping at a first angle with respect to the orthogonal face; the recess portion is configured to include a pair of recess portion sloping faces, sloping at a second angle with respect to the opposing face; and the first angle is set smaller than the second angle.

In the vehicle mirror device of the second aspect, the protrusion portion includes the pair of protrusion portion sloping faces, the protrusion portion sloping faces sloping at the first angle with respect to the orthogonal face. The recess portion includes the pair of recess portion sloping faces, with the recess portion sloping faces sloping at the second angle with respect to the opposing face.

The first angle is set smaller than the second angle. The protrusion portion sloping faces and the recess portion sloping faces therefore do not make face-to-face contact when the recess portion fits with the protrusion portion due to a configuration in which boundary portions between the recess portion sloped faces and the opposing face make contact with the protrusion portion sloping faces respectively. The gap dimension of the second gap can accordingly be stabilized since the protrusion portion and the recess portion can be made to contact each other stably. Moreover, sliding resistance when the protrusion portion slides against the recess portion can be reduced since the protrusion portion sloping faces and the recess portion sloping faces do not make face-to-face contact.

It is possible in the second aspect that the pair of protrusion portion sloping faces and the pair of recess portion sloping faces are formed such that boundary portions which are between the recess portion sloping faces and the opposing face make contact with the protrusion portion sloping faces respectively when the recess portion is fitted with the protrusion portion.

It is possible in the second aspect that a dimension between boundary portions which are between the pair of recess portion sloped faces and the opposing face is set smaller than a dimension between boundary portions which are between the pair of protrusion portion sloping faces and the orthogonal face.

A vehicle mirror device of a third aspect is the vehicle mirror device of the first aspect or the second aspect wherein a third gap is formed in the upper and lower direction between the protrusion portion and the recess portion.

In the vehicle mirror device of the third aspect, the third gap is formed in the upper and lower direction between the protrusion portion (an upper face thereof) and the recess portion (a bottom face thereof). The third gap in the upper and lower direction between the protrusion portion and the recess portion can accordingly be maintained even suppose the protrusion portion wears due to rotation of the housing member. In other words, the recess portion approaches the protrusion portion by an amount according to the amount of wear to the protrusion portion since the recess portion and the protrusion portion contacting each other along the rotating body rotating direction. On the other hand, the external shape (edge) of the protrusion portion separates from the recess portion by an amount corresponding to the amount of wear to the protrusion portion. Contact between portions of the recess portion and the protrusion portion other than the contact locations of the recess portion and the protrusion portion before the second gap disappears can accordingly be suppressed from occurring. Rattling of the housing member against the stay by the portions other than the contact locations is thereby suppressed from occurring A vehicle mirror device of a fourth aspect is the vehicle mirror device of any one of the first aspect to the third aspect wherein an overlap amount of the protrusion portion and the recess portion in the upper and lower direction when the protrusion portion and the recess portion are fitted is set larger than the second gap.

In the vehicle mirror device of the fourth aspect, the upper and lower direction overlap amount when the protrusion portion and the recess portion are fitted is set larger than the second gap. The protrusion portion and the recess portion accordingly overlap in the upper and lower direction even when the protrusion portion wears and the orthogonal face and the opposing face come into contact (even when the second gap disappears). A detent sensation can therefore always be imparted to the housing member by the protrusion portion and the recess portion due to the protrusion portion and the recess portion always overlapping in the upper and lower direction.

According to the vehicle mirror device of the first aspect, rattling of the housing member against the stay can be suppressed from occurring even when the protrusion portion wears down.

According to the vehicle mirror device of the second aspect, the dimension of the second gap can be stabilized.

According to the vehicle mirror device of the third aspect, rattling of the housing member against the stay by (at) the portions other than the contact locations where the recess portion and the protrusion portion contact each other can be suppressed from occurring.

According to the vehicle mirror device of the fourth aspect, a detent sensation can always be imparted to the housing member by the protrusion portion and the recess portion.

BRIEF DESCRIPTION OF THE DRAWINGS

Exemplary embodiments of the present invention will be described in detail based on the following figures, wherein.

DETAILED DESCRIPTION OF THE INVENTION

In the present exemplary embodiment, explanation is first given regarding an overall configuration of a vehicle door mirror device 10 serving as a vehicle mirror device according to an exemplary embodiment of the present invention, and explanation then follows regarding a configuration of a detent mechanism 54 that is a relevant portion of the present invention.

Overall Configuration of the Vehicle Door Mirror Device 10

Figure 2:
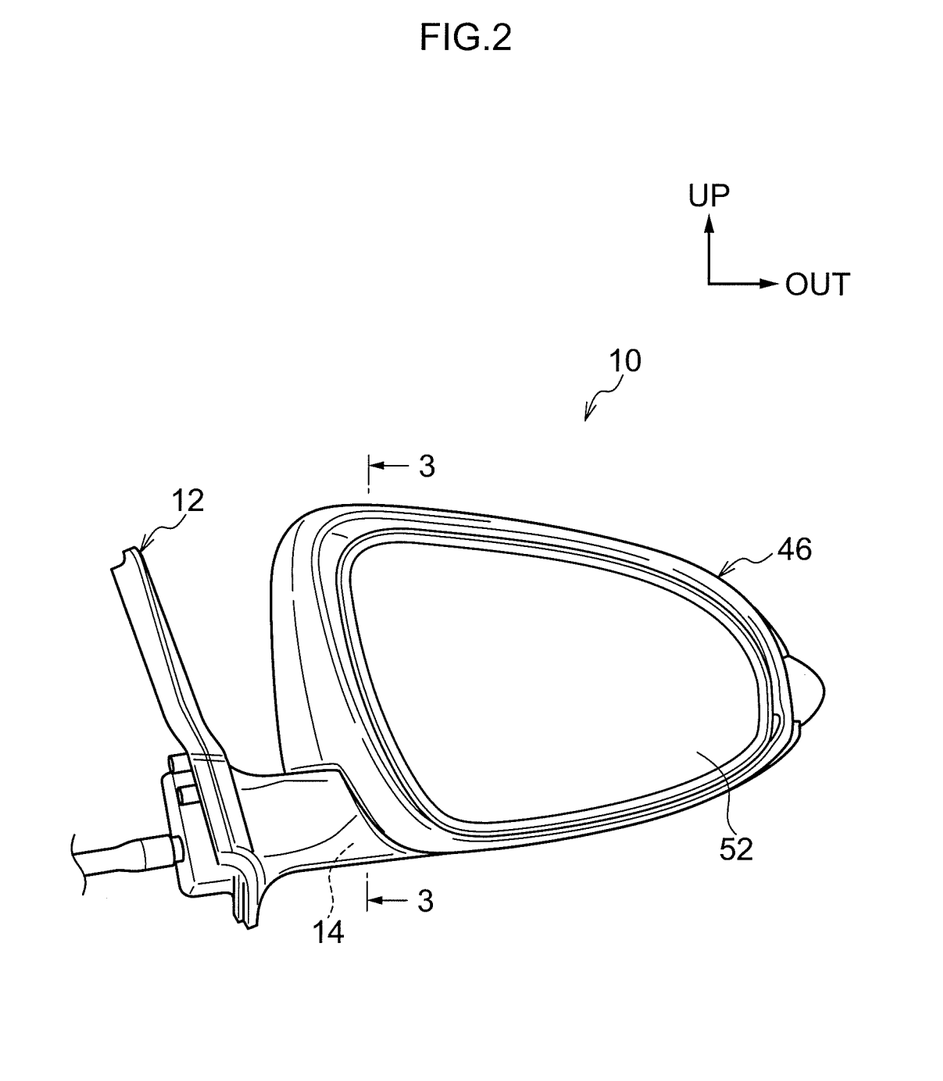
FIG. 2 is a face-on view as seen from the vehicle rear, illustrating a vehicle door mirror device according to an exemplary embodiment of the present invention.
Figure 3:
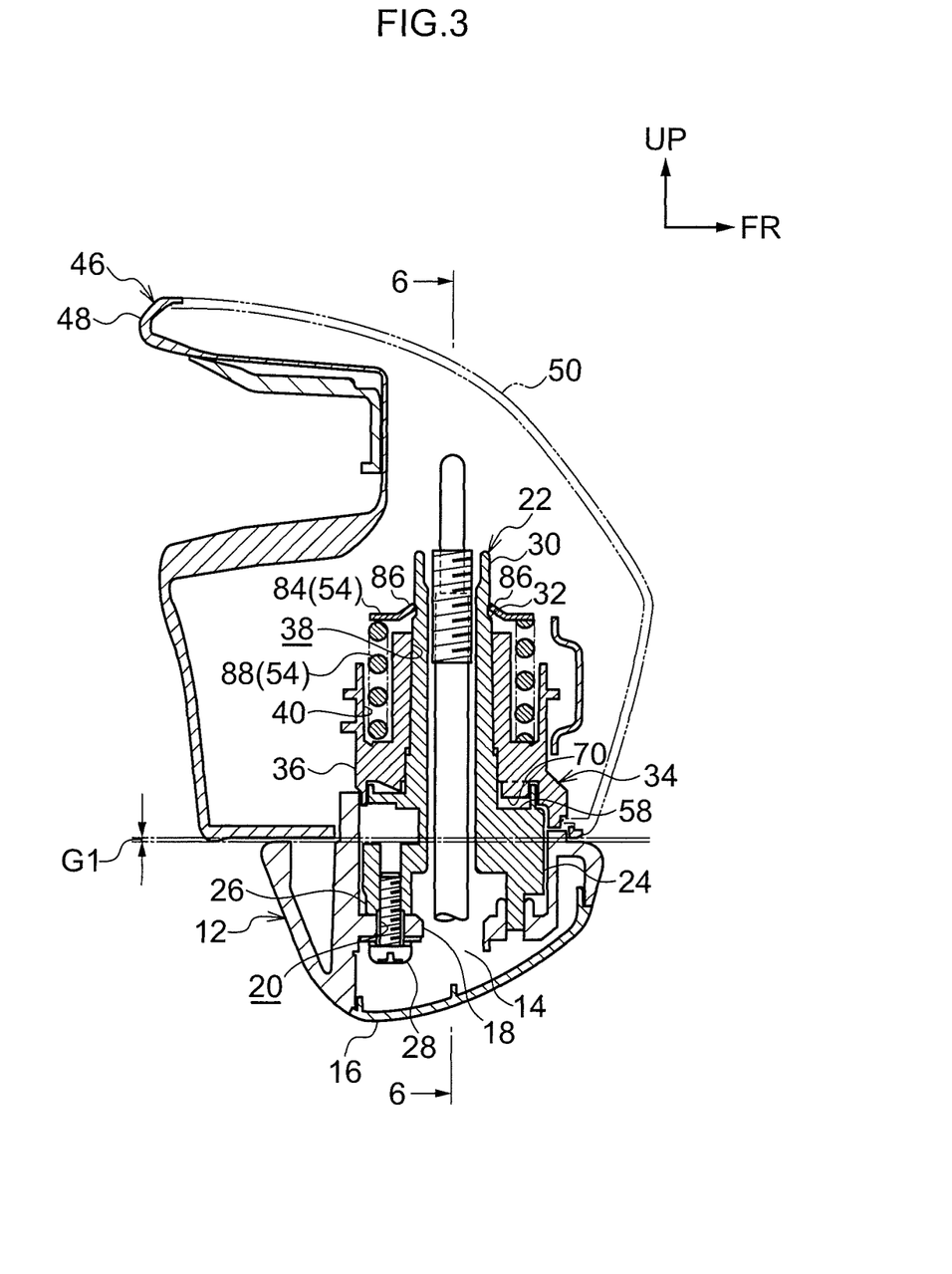
FIG. 3 is a cross-section (taken along line 3-3 in FIG. 2) illustrating the vehicle door mirror device shown in FIG. 2.

FIG. 2 is a face-on overall view of a vehicle door mirror device 10 viewed from the vehicle rear. FIG. 3 is a cross-section of the vehicle door mirror device 10 viewed from the vehicle width direction outside. Note that in the drawings, the arrow FR indicates the vehicle front, the arrow OUT indicates the vehicle width direction outside (the vehicle right), and the arrow UP indicates upwards, as appropriate. The vehicle door mirror device 10 is provided to a vehicle door (not shown in the drawings), and is disposed at the vehicle width direction outside of the vehicle.

As shown in FIG. 2 and FIG. 3, the vehicle door mirror device 10 includes a stay 12, a stand 22 serving as a support member, a case 34 serving as a rotating body, and a visor 46 serving as a housing member.

The stay 12 is disposed at the vehicle width direction outside of the vehicle door, with a vehicle width direction inside portion of the stay 12 fixed to the vehicle door (vehicle body). A vehicle width direction outside portion of the stay 12 is provided with a stand housing portion 14 for housing the stand 22, described later. As shown in FIG. 3, the stand housing portion 14 is open towards the upper side and the lower side. The opening portion of the stand housing portion 14 that is open towards the lower side is closed off by a lower cover 16. Fixing portions 18 for fixing the stand 22, described later, are provided to the stand housing portion 14 at 3 locations (only one fixing portion 18 at a single location is shown in FIG. 3). The fixing portions 18 are disposed along a direction orthogonal to the upper and lower direction. Each of the fixing portions 18 is disposed in a direction orthogonal to the upper and lower direction, and each of the fixing portions 18 is formed in penetration manner with an insertion hole 20 in the upper and lower direction.

As shown in FIG. 3 to FIG. 6, the stand 22 is disposed in the stand housing portion 14 of the stay 12. The stand 22 is manufactured from resin. A lower portion of the stand 22 is provided with a substantially circular columnar shaped stand-side base portion 24. Fixed-into portions 26 are provided to a lower end portion of the stand-side base portion 24 at 3 locations (see FIG. 5). The fixed-into portions 26 are each formed in the shape of a bottomed circular cylinder, and project downwards from the stand-side base portion 24 and arranged at positions corresponding to the fixing portions 18. Screws 28 are inserted into the insertion holes 20 of the fixing portions 18 of the stay 12, and the fixed-into portions 26 are fastened (fixed) to the fixing portions 18 by the screws 28 (see FIG. 3). Accordingly, the stand 22 is coupled to the vehicle door (vehicle body) via the stay 12.

A substantially circular cylinder shaped support shaft 30 is provided to a substantially central portion of the stand-side base portion 24. The support shaft 30 projects upwards from the stand-side base portion 24. A groove portion 32 is provided to an outer peripheral portion of an upper end portion of the support shaft 30. The groove portion 32 is open towards the radial direction outside of the support shaft 30 and is formed around the support shaft 30 circumferential direction.

The case 34 is manufactured from resin and is provided above the stand-side base portion 24. The case 34 includes a substantially circular cylinder shaped case-side base portion 36. A support hole 38 is formed in penetration manner in the upper and lower direction at a substantially central portion of the case-side base portion 36. The support shaft 30 of the stand 22 is inserted into the support hole 38, and the upper end portion of the support shaft 30 projects further upwards with respect to the case-side base portion 36. The case 34 is accordingly supported by the support shaft 30 of the stand 22 so as to be capable of rotating.

Figure 4:
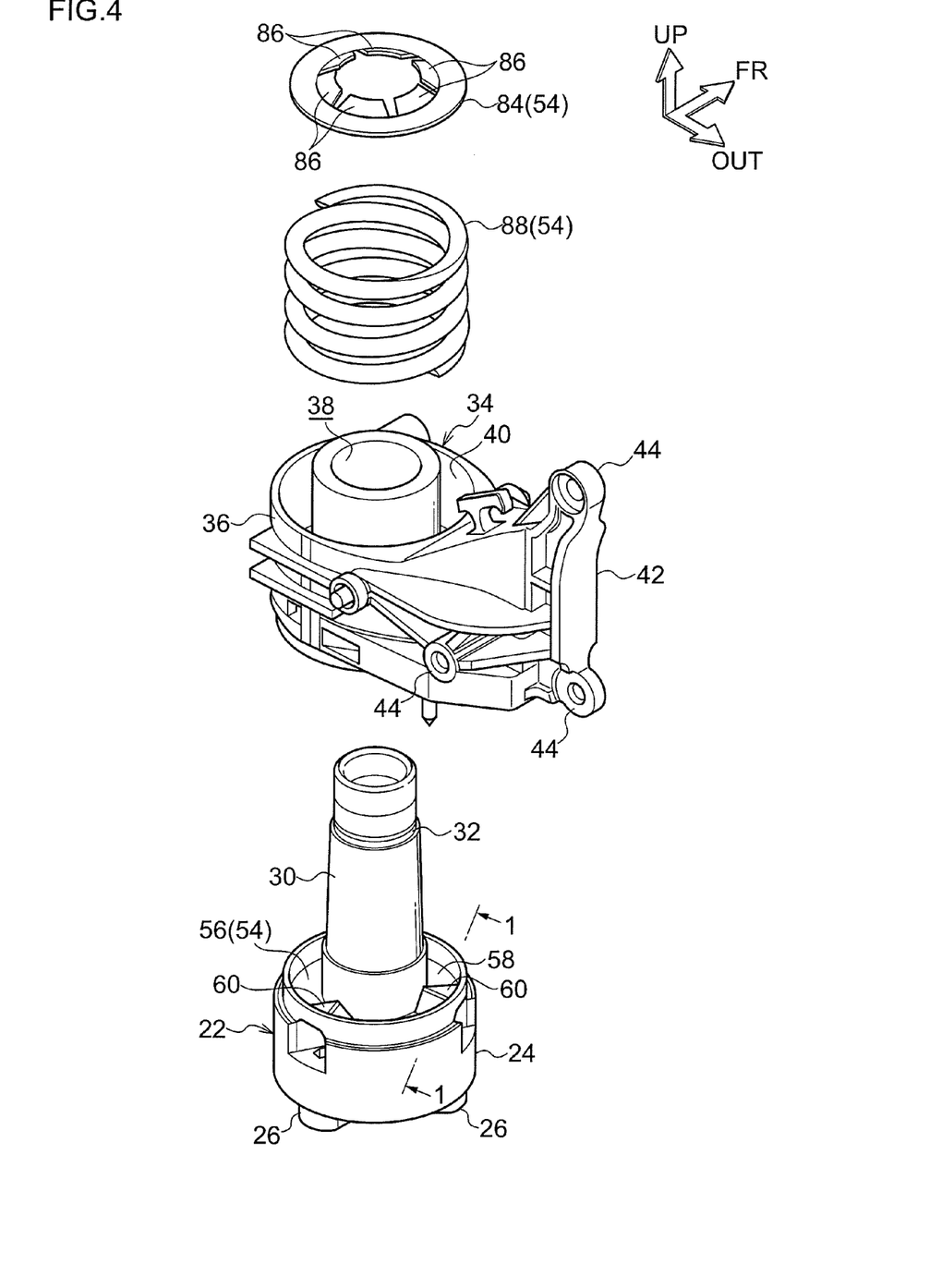
FIG. 4 is an exploded perspective view as seen from diagonally above, illustrating relevant portions of the vehicle door mirror device shown in FIG. 2.

As shown in FIG. 4, a spring housing portion 40 for housing a compression spring 88, described later, is provided at an upper portion of the case-side base portion 36 at the radial direction outside of the support hole 38. The spring housing portion 40 is formed with a recessed shape around the support hole 38 circumferential direction, and is open towards the upper side.

The case 34 is further provided with a support portion 42 at a vehicle width direction outside of the case-side base portion 36. The support portion 42 projects out from the case-side base portion 36 towards the radial direction outside of the support hole 38 and is integrally formed with the case-side base portion 36. Fastening portions 44 for fastening the visor 46 to, described later, are provided to the support portion 42 at 4 locations (see FIG. 5).

As shown in FIG. 3, the visor 46 includes a main body portion 48 configuring a vehicle rear portion of the visor 46 and a cover portion 50 configuring a vehicle front portion of the visor 46. The cover portion 50 is integrally assembled with the main body portion 48. The visor 46 is formed in a substantially rectangular parallelopiped container shape, and the vehicle rear face of the visor 46 is open. An outer mirror 52 is provided inside the visor 46 at the open portion of the visor 46. The entire peripheral portion and the vehicle front face of the outer mirror 52 are covered by the visor 46 (see FIG. 2). The mirror finished surface of the outer mirror 52 is disposed facing towards the vehicle rear, enabling occupant to visually check to the rear of the vehicle using the outer mirror 52.

The stand 22 and the case 34 are both covered by the visor 46 in a state in which the stand 22 and the case 34 are housed inside the visor 46. The visor 46 is fastened (joined) to the case 34 by fastening members such as screws, not shown in the drawings, at the locations of the fastening portions 44 of the case 34. The visor 46 is accordingly configured so as to be capable of rotating about the support shaft 30 of the stand 22. The visor 46 is configured so as to be capable of rotating between the use position shown in FIG. 2 and a storage position in which the outer mirror 52 is disposed substantially facing the vehicle door. Note that the visor 46 is also configured so as to be capable of rotating towards a forward folded position in an emergency, wherein the outer mirror 52 is disposed facing substantially towards the vehicle width direction outside.

As shown in FIG. 3, a gap G1 serving as a first gap is formed in the upper and lower direction between a lower portion of the visor 46 and the stay 12. Accordingly, configuration is such that in an initial state, the visor 46 and the stay 12 are not in contact with each other in the upper and lower direction.

Configuration of the Detent Mechanism 54

Figure 5:
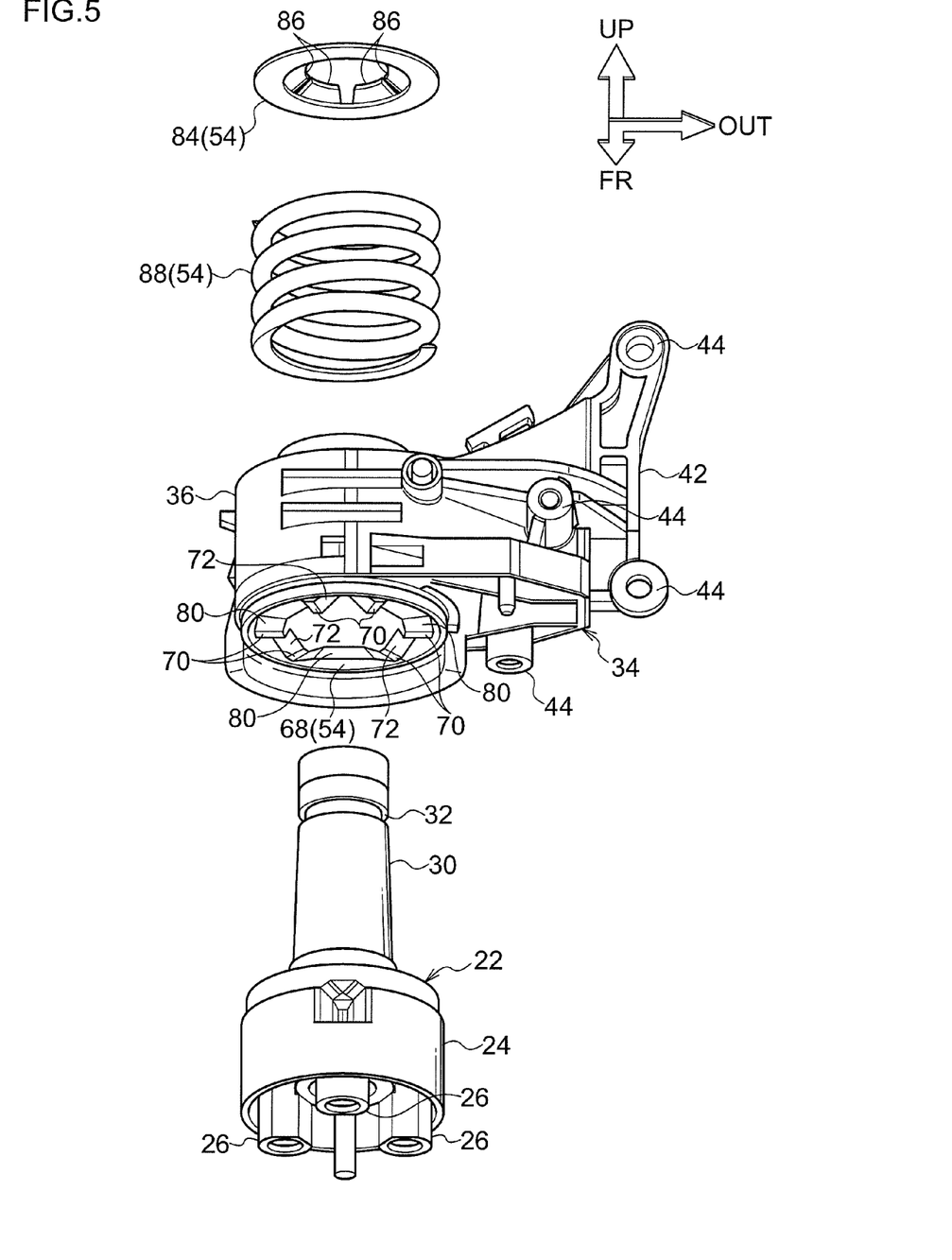
FIG. 5 is an exploded perspective view as seen from diagonally below, illustrating relevant portions of the vehicle door mirror device shown in FIG. 2.
Figure 6:
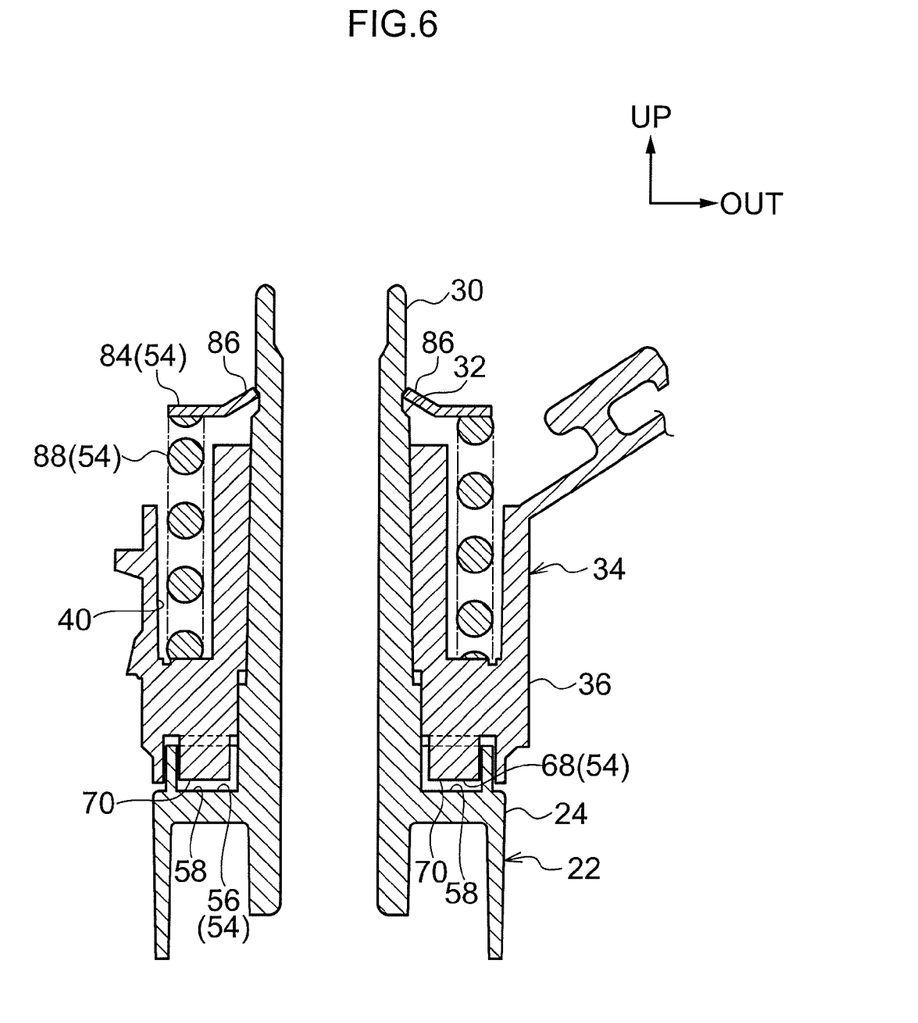
FIG. 6 is a vertical cross-section (taken along line 6-6 in FIG. 3) showing relevant portions illustrated in FIG. 4.

Explanation follows regarding the configuration of the detent mechanism 54. As shown in FIG. 4 and FIG. 5, the detent mechanism 54 includes a detent imparting section 56 provided to the stand 22, a detent imparted section 68 provided to the case 34, the compression spring 88 (an element that can be considered as a biasing member in a broad sense) and a spring washer 84 (an element that can be considered as a restricting member in a broad sense).

As shown in FIG. 4, the detent imparting section 56 is provided at an upper portion of the stand-side base portion 24 at a radial direction outside of the support shaft 30. The detent imparting section 56 includes an orthogonal face 58. The orthogonal face 58 is disposed in a direction orthogonal to the axial direction (the upper and lower direction) of the support shaft 30.

The orthogonal face 58 is provided with plural (3 in the present exemplary embodiment) fitting (interlocking) protrusion portions 60 serving as protrusion portions. The fitting protrusion portions 60 protrude upwards with respect to the orthogonal face 58 (the fitting protrusion portions 60 are only shown at 2 locations in FIG. 4). The fitting protrusion portions 60 extend in a radial manner from the support shaft 30 towards the radial direction outer side of the support shaft 30 and are disposed at specific intervals (every 120 degrees) around the support shaft 30 circumferential direction. The fitting protrusion portions 60 are each formed with trapeze shaped cross-section as viewed along support shaft 30 radial direction.

Figure 1:
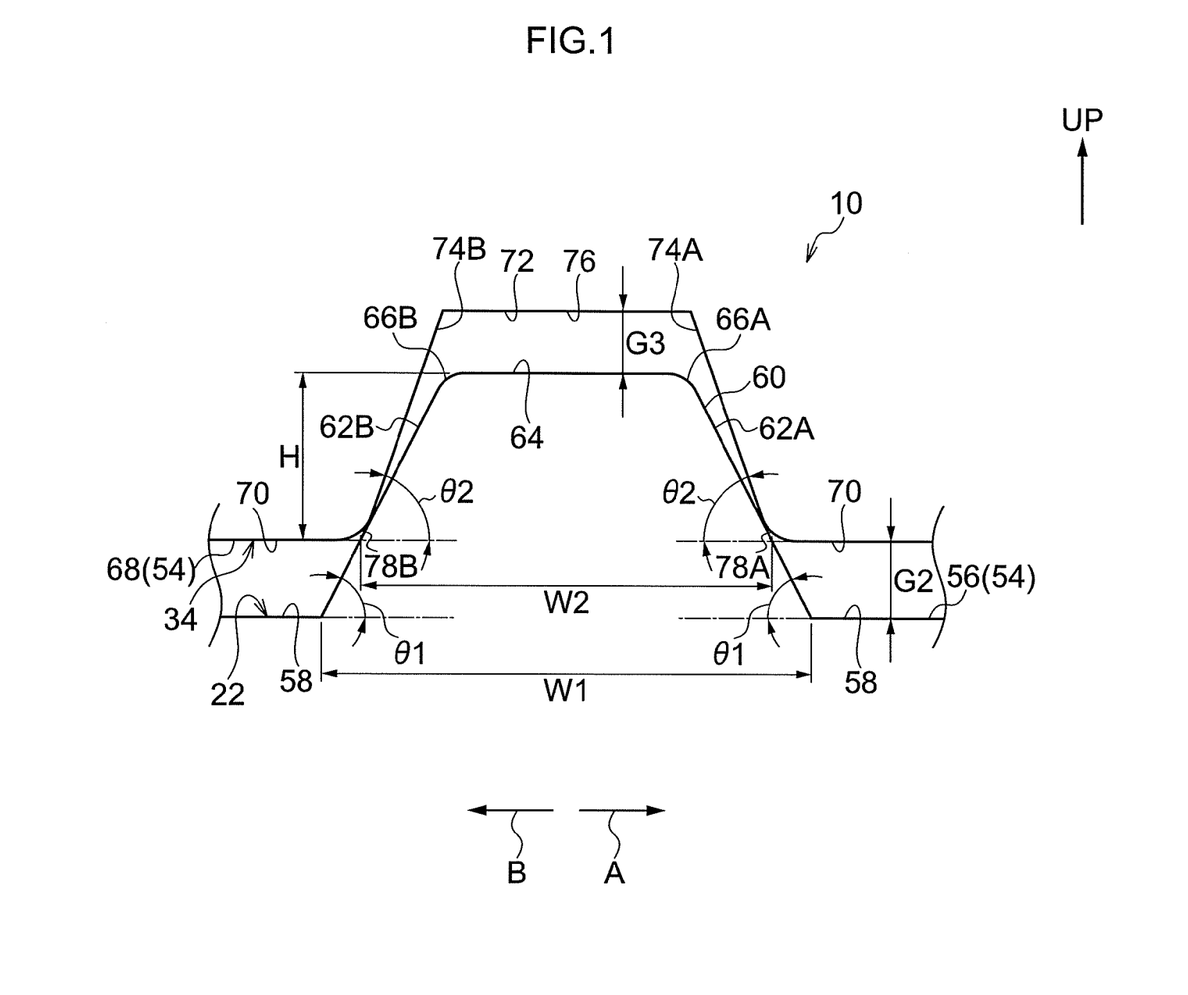
FIG. 1 is an enlarged cross-section as seen from the radial direction outside of a support shaft, illustrating an fitting state of an fitting recess portion and an fitting protrusion portion employed in a vehicle door mirror device according to an exemplary embodiment of the present invention (taken along line 1-1 in FIG. 4)

As shown in FIG. 1, the fitting protrusion portion 60 includes a pair of protrusion portion sloping faces 62A and 62B. Note that in FIG. 1, hatching has been omitted for ease of explanation. The protrusion portion sloping faces 62A and 62B slope in directions that mutually approach each other on progression upwards. The angles formed between the protrusion portion sloping faces 62A and 62B and the orthogonal face 58 are set at an angle θ1, serving as a first angle. An upper face 64 spans between upper ends of the protrusion portion sloping faces 62A and 62B. The upper face 64 is disposed in a direction orthogonal to the support shaft 30 axial direction. Boundary portions between the upper face 64 and the protrusion portion sloping faces 62A and 62B respectively configure protrusion portion boundary portions 66A and 66B. The width dimension at a lower edge of the fitting protrusion portion 60 (the dimension between boundary portions between the protrusion portion sloping faces 62A and 62B and the orthogonal face 58) when the fitting protrusion portion 60 is viewed in cross-section along support shaft 30 radial direction configures a width dimension W1.

As shown in FIG. 5, the detent imparted section 68 is provided at a lower end portion of the case-side base portion 36, and is formed above the detent imparting section 56 of the stand 22 at a position facing the detent imparting section 56. The detent imparted section 68 includes an opposing face 70. The opposing face 70 is formed in a circular ring shape at a position facing the fitting protrusion portions 60, and is disposed parallel to the orthogonal face 58 of the stand 22.

The opposing face 70 is provided with plural (3 in the present exemplary embodiment) fitting (interlocking) recess portions 72 serving as recess portions. The fitting recess portions 72 are open towards the lower side. The fitting recess portions 72 extend in a radial manner in support shaft 30 radial directions and are disposed at specific intervals (every 120 degrees) around the support shaft 30 circumferential direction. The fitting recess portions 72 are each formed with trapeze shaped cross-section as viewed along a support shaft 30 radial direction.

As shown in FIG. 1, the fitting recess portion 72 includes a pair of recess portion sloping faces 74A and 74B. The recess portion sloping faces 74A and 74B slope in directions that approach each other on progression upwards. The angles formed between the recess portion sloping faces 74A and 74B and the opposing face 70 are configured at an angle θ2, serving as a second angle. Angle θ2 is set larger than angle θ1. More specifically, the difference between angle θ2 and angle θ1 is set at 0.5 degree or greater. A recess-bottom face 76 spans between upper ends of the pair of recess portion sloping faces 74A and 74B. The recess-bottom face 76 is disposed parallel to the upper face 64 of the fitting protrusion portion 60.

The boundary portions between the recess portion sloping faces 74A and 74B and the opposing face 70 respectively configure recess portion boundary portions 78A and 78B. The recess portion boundary portions 78A and 78B are formed with circular arc shaped cross-sections. When the fitting recess portion 72 is viewed in cross-section along support shaft 30 radial direction, a width dimension W2 of the opening portion of the fitting recess portion 72 (a dimension between the pair of recess portion boundary portions 78A and 78B) is set smaller than the width dimension W1 of the fitting protrusion portion 60.

As shown in FIG. 5, the opposing face 70 is provided with a sliding recess portion 80 at a position between the respective fitting recess portions 72. The sliding recess portions 80 are provided at 3 locations. The sliding recess portion 80 is open towards the lower side. The sliding recess portions 80 are disposed at specific intervals (every 120 degrees) around the support shaft 30 circumferential direction, and each of the sliding recess portions 80 extends further around the support shaft 30 circumferential direction than each of the fitting recess portions 72. The upper and lower direction depth of the sliding recess portion 80 is set shallower than the upper and lower direction depth of the fitting recess portion 72.

As shown in FIG. 1, configuration is such that when the visor 46 is rotated to the use position or the storage position, the fitting protrusion portion 60 is disposed inside the fitting recess portion 72, and the fitting recess portion 72 fits (interlocks) with the fitting protrusion portion 60. When the fitting recess portion 72 is fitted with the fitting protrusion portion 60, the pair of recess portion boundary portions 78A and 78B of the fitting recess portion 72 contact the protrusion portion sloping faces 62A and 62B of the fitting protrusion portion 60 due to the angle θ2 being set larger than the angle θ1 and the width dimension W1 being set larger than the width dimension W2. In other words, the fitting recess portions 72 and the fitting protrusion portions 60 contact each other in the rotating direction (the arrow A direction and the arrow B direction in FIG. 1) of the case 34 (the visor 46).

A gap G2, serving as a second gap, is formed in the upper and lower direction between the orthogonal face 58 and the opposing face 70, due to the pair of recess portion boundary portions 78A and 78B of the fitting recess portion 72 contacting the protrusion portion sloping faces 62A and 62B of the fitting protrusion portion 60 in the case 34 rotating direction. The dimension of the gap G2 is set larger than the dimension of the gap G1. A gap G3, serving as a third gap, is formed in the upper and lower direction between the upper face 64 of the fitting protrusion portion 60 and the bottom face 76 of the fitting recess portion 72. The dimension of the gap G3 is set smaller than the dimensions of the gap G2. Furthermore, an overlap amount H in the upper and lower direction of the fitting protrusion portion 60 with the fitting recess portion 72 (the dimension in the upper and lower direction between the upper face 64 of the fitting protrusion portion 60 and the opposing face 70) is set larger than the gap G2.

When the visor 46 is rotated between the use position and the storage position, the case 34 rotates about the support shaft 30, and the detent imparted section 68 of the case 34 rotates relative to the detent imparting section 56 of the stand 22. Here, at this time, configuration is such that a fitting protrusion portion 60 leaves a fitting recess portion 72 in which this fitting protrusion portion 60 was disposed so as to be disposed in next fitting recess portion 72 adjacent to the fitting recess portion 72 in which this fitting protrusion portion 60 was disposed so each fitting protrusion portion 60 fits with the adjacent fitting recess portion 72.

As shown in FIG. 4 and FIG. 5, the spring washer 84 is formed with a substantially circular ring plate shape. An inner peripheral portion of the spring washer 84 is provided with plural (6 in the present exemplary embodiment) restricting portions 86. Each of the restricting portions 86 is bent so as to slope upwards on progression towards the radial direction inside of the spring washer 84. The upper end portion of the support shaft 30 is inserted inside of the spring washer 84, and leading end portions of the restricting portions 86 engage with the groove portion 32 of the support shaft 30. Upward movement of the spring washer 84 is accordingly restricted.

The compression spring 88 is formed along the upper and lower direction in a spiral shape and is provided between the spring housing portion 40 of the case 34 and the spring washer 84. A lower end of the compression spring 88 contacts the bottom face of the spring housing portion 40 of the case 34 and an upper end of the compression spring 88 contacts the spring washer 84 in a state in which the compression spring 88 has been compressed from its natural state (the natural state being a state in which biasing force is not acting on the compression spring 88). The compression spring 88 accordingly biases the case 34 downwards, biasing the fitting recess portions 72 in the fitting direction with the fitting protrusion portions 60.

Explanation follows regarding the operation and advantageous effects of the present exemplary embodiment.

In the vehicle door mirror device 10 configured as described above, in the use position of the visor 46, the fitting recess portion 72 fits with the fitting protrusion portion 60 in a state in which the recess portion boundary portions 78A and 78B of the fitting recess portion 72 are in contact with respective the pair of the protrusion portion sloping faces 62A and 62B of the fitting protrusion portions 60. The recess portion boundary portions 78A and 78B press (push) the protrusion portion sloping faces 62A and 62B by the bias force of the compression spring 88, due to the compression spring 88 biasing the fitting recess portions 72 in a direction in which the fitting recess portions 72 are fitted in the fitting protrusion portions 60. The visor 46 is accordingly mounted without rattle to the stay 12.

Explanation follows regarding rotating the visor 46 from the use position to the storage position. The case 34 is rotated about the support shaft 30 relative to the stand 22 when the visor 46 is rotated from the use position to the storage position. In other words, the stand 22 is rotated in the direction opposite to the rotating direction of the visor 46 (the arrow A direction in FIG. 1) relative to the case 34. The protrusion portion sloping face 62A therefore slides on the recess portion boundary portion 78A against the biasing force of the compression spring 88. The case 34 accordingly moves upwards relative to the stand 22 against the biasing force of the compression spring 88.

The upper face 64 of the fitting protrusion portion 60 slides on the opposing face 70 of the case 34 when the protrusion portion boundary portion 66A of the fitting protrusion portion 60 reaches the recess portion boundary portion 78A of the fitting recess portion 72.

As the visor 46 is rotated further towards the storage position, the protrusion portion boundary portion 66B of the fitting protrusion portion 60 reaches the boundary portion between the opposing face 70 and the sliding recess portion 80, and it slides on the inner peripheral face of the sliding recess portion 80. The case 34 accordingly moves downward relative to the stand 22 by the biasing force of the compression spring 88. The visor 46 is accordingly imparted with detent sensation by the fitting protrusion portion 60 passing over the opposing face 70 when the fitting protrusion portion 60 is moved (rotated) from the fitting recess portion 72 to the sliding recess portion 80.

When the visor 46 is rotated further towards the storage position, the protrusion portion boundary portion 66A of the fitting protrusion portion 60 reaches the next opposing face 70, and the upper face 64 of the fitting protrusion portion 60 slides on the opposing face 70.

Further, when the protrusion portion boundary portion 66B of the fitting protrusion portion 60 reaches the next recess portion boundary portion 78B of the fitting recess portion 72, the protrusion portion boundary portion 66B slides on the recess portion sloping face 74B of the next fitting recess portion 72, and the next fitting recess portion 72 fit with the fitting protrusion portion 60. The visor 46 is accordingly imparted with the detent sensation by the fitting protrusion portion 60 passing across the next opposing face 70 when the fitting protrusion portion 60 is moved (rotated) from the sliding recess portion 80 towards the next fitting recess portion 72.

As described above, the visor 46 is rotated from the use position to the storage position, and the fitting recess portion 72 fits with the fitting protrusion portion 60, in a state in which the recess portion boundary portions 78A and 78B of the fitting recess portion 72 contact with the protrusion portion sloping faces 62A and 62B of the fitting protrusion portion 60. Once again, the recess portion boundary portions 78A and 78B press the protrusion portion sloping faces 62A and 62B by the bias force of the compression spring 88 due to the compression spring 88 biasing the fitting recess portions 72 in the fitting protrusion portions 60 fitting direction. The visor 46 is accordingly mounted without rattle to the stay 12.

As described above, when the case 34 rotates relatively to the stand 22, the fitting protrusion portions 60 are always sliding over the fitting recess portions 72, over the opposing faces 70 and over the sliding recess portions 80. Configuration is therefore such that the fitting protrusion portions 60 are more prone to wear than the fitting recess portions 72.

Suppose the fitting protrusion portions 60 wear through rotating of the visor 46 many times, the external shape of the each fitting protrusion portion 60 accordingly becomes smaller. There therefore might have been a possibility of rattling occurring between the fitting recess portion 72 and the fitting protrusion portion 60 in the fitting state between the fitting recess portion 72 and the fitting protrusion portion 60.

However, when the fitting recess portion 72 is fitted with the fitting protrusion portion 60, the gap G2 is formed between the orthogonal face 58 and the opposing face 70, due to the recess portion boundary portions 78A and 78B of the fitting recess portions 72 and the protrusion portion sloping faces 62A and 62B of the fitting protrusion portions 60 mutually contacting each other along the case 34 rotating direction. Accordingly, even supposing the fitting protrusion portion 60 wears and the external shape of the fitting protrusion portion 60 becomes smaller, the fitting recess portion 72 and the fitting protrusion portion 60 fits with the recess portion boundary portions 78A and 78B and the protrusion portion sloping faces 62A and 62B in a mutually contacting state along the case 34 rotating direction until the gap G2 disappears (until the opposing face 70 contacts the orthogonal face 58). Rattling of the visor 46 against the stay 12 can accordingly be suppressed from occurring at an early stage.

Suppose the fitting protrusion portion 60 wears and the gap G2 becomes smaller, the gap G1 also becomes smaller (the visor 46 gets closer to the stay 12) due to the visor 46 being joined (fastened) to the case 34. The gap G2 is set larger than the gap G1. Therefore, even in a case when the amount of wear to the fitting protrusion portion 60 becomes large and the visor 46 ultimately contacts the stay 12 (the gap G1 disappears), the recess portion boundary portions 78A and 78B and the protrusion portion sloping faces 62A and 62B still mutually contact each other along the case 34 rotating direction due to the gap G2 formed between the opposing face 70 and the orthogonal face 58. Accordingly, even in a case, for example, the visor 46 contacting the stay 12 is taken as an indicator (measure) of the useful life of the vehicle door mirror device 10, rattling of the visor 46 against the stay 12 can still be suppressed at this stage since the fitting recess portion 72 and the fitting protrusion portion 60 are in mutual contact along the case 34 (visor 46) rotating direction.

Rattling of the visor 46 against the stay 12 in the visor 46 rotating directions can accordingly be suppressed even when the fitting protrusion portions 60 have worn through rotating of the visor 46 many times.

The angle θ1 formed between the protrusion portion sloping faces 62A and 62B and the orthogonal face 58 is also set smaller than the angle θ2 formed between the opposing face 70 and the recess portion sloping faces 74A and 74B. The protrusion portion sloping faces 62A and 62B and the recess portion sloping faces 74A and 74B therefore do not make face-to-face contact, since it is the recess portion boundary portions 78A and 78B that contact the protrusion portion sloping faces 62A and 62B when the fitting recess portion 72 and the fitting protrusion portion 60 fit. The dimension of the gap G2 can accordingly be stabilized since the fitting protrusion portions 60 and the fitting recess portions 72 can be made to stably contact each other. Moreover, sliding resistance can be reduced when the protrusion portion sloping faces 62A and 62B slide against the recess portion boundary portions 78A and 78B due to the protrusion portion sloping faces 62A and 62B and the recess portion sloping faces 74A and 74B not making face-to-face contact.

The gap G3 is formed in the upper and lower direction between the upper face 64 of the fitting protrusion portion 60 and the bottom face 76 of the fitting recess portion 72. The gap G3 is accordingly maintained even when the fitting protrusion portion 60 wears down. In other words, the fitting recess portion 72 approaches the fitting protrusion portion 60 by an amount corresponding to the amount of wear of the fitting protrusion portion 60 because of the recess portion boundary portions 78A and 78B contacting the protrusion portion sloping faces 62A and 62B. On the other hand, the upper face 64 and the protrusion portion sloping faces 62A and 62B of the fitting protrusion portion 60 separate from the fitting recess portion 72 by an amount corresponding to the amount of wear of the fitting protrusion portion 60. Contact between the upper face 64 of the fitting protrusion portion 60 and the bottom face 76 of the fitting recess portion 72 before the gap G2 disappears can accordingly be suppressed from occurring. The visor 46 is thereby suppressed from rattling due to contact between the upper face 64 of the fitting protrusion portion 60 and the bottom face 76 of the fitting recess portion 72 against the stay 12.

The upper and lower direction overlap amount H when the fitting recess portion 72 and the fitting protrusion portion 60 are fitted is set larger than the gap G2. The fitting protrusion portion 60 and the fitting recess portion 72 accordingly overlap in the upper and lower direction even when the fitting protrusion portion 60 wears to the extent that the orthogonal face 58 and the opposing face 70 come into contact (even when the gap G2 disappears). The detent sensation can therefore always be imparted to the visor 46 by the fitting protrusion portions 60 and the fitting recess portions 72 when rotating the visor 46.

Moreover, the recess portion boundary portions 78A and 78B of the case 34 are formed with circular arc shaped cross-sections. The protrusion portion sloping faces 62A and 62B therefore make line (tangential) contact with the recess portion boundary portions 78A and 78B, and the sliding resistance when the protrusion portion sloping faces 62A and 62B slide over the recess portion sloping faces 74A and 74B can accordingly be further reduced.

By manufacturing the stand 22 out of resin, a reduction in weight can be achieved for the vehicle door minor device 10, and an increase in cost of the vehicle door mirror device 10 can also be suppressed.

Note that in the present exemplary embodiment, the stand 22 is manufactured out of resin. Alternatively, the stand 22 may be manufactured out of metal with the fitting protrusion portions 60 manufactured out of resin by employing for example insert molding (forming). The stand 22 may also be manufactured entirely out of metal. This allows wear to the fitting protrusion portions 60 to be better suppressed.

In the present exemplary embodiment, configuration is made such that the recess portion boundary portions 78A and 78B contact the protrusion portion sloping faces 62A and 62B when the fitting recess portion 72 fits with the fitting protrusion portion 60. Alternatively, configuration may be made such that the recess portion sloping faces 74A and 74B make face-to-face contact with the protrusion portion sloping faces 62A and 62B when the fitting recess portion 72 fits with the fitting protrusion portion 60.

In the present exemplary embodiment, the angle θ1 formed between the orthogonal face 58 and the protrusion portion sloping faces 62A and 62B is set smaller than the angle θ2 formed between the opposing face 70 and the recess portion sloping faces 74A and 74B. Alternatively, the angle θ2 formed between the opposing face 70 and the recess portion sloping faces 74A and 74B may be set smaller than the angle θ1 formed between the orthogonal face 58 and the protrusion portion sloping faces 62A and 62B.

What is claimed is:

1. A vehicle minor device comprising:
   a support member that is fixed to a stay assembled to a vehicle body and that includes a support shaft;
   a rotating body that is rotatably supported at the support shaft;
   a housing member that houses an outer minor, the housing member being joined to the rotating body, and being disposed such that a first gap is formed between the housing member and the stay in an axial direction of the support shaft;
   a detent imparting section that imparts a detent sensation to the housing member when the rotating body rotates, the detent imparting section being provided at the support member and the detent imparting section including an orthogonal face disposed so as to be orthogonal to the axial direction of the support shaft, and a protrusion portion protruding upwards from the orthogonal face; and
   a detent imparted section that is provided at the rotating body and that includes an opposing face disposed facing the orthogonal face and disposed so as to be orthogonal to the axial direction of the support shaft, and a recess portion provided at the opposing face and configured to be capable of fitting with the protrusion portion,
   wherein a second gap is formed in the axial direction of the support shaft between the orthogonal face and the opposing face due to the recess portion and the protrusion portion being in contact with each other along a rotating direction of the rotating body when the recess portion is fitted with the protrusion portion, and the second gap is set larger than the first gap in the axial direction of the support shaft.

2. The vehicle minor device of claim 1, wherein:
   the protrusion portion is configured to include a pair of protrusion portion sloping faces, sloping at a first angle with respect to the orthogonal face;
   the recess portion is configured to include a pair of recess portion sloping faces, sloping at a second angle with respect to the opposing face; and
   the first angle is set smaller than the second angle.

3. The vehicle mirror device of claim 1, wherein a third gap is formed in the upper and lower direction between the protrusion portion and the recess portion.

4. The vehicle mirror device of claim 2, wherein a third gap is formed in the upper and lower direction between the protrusion portion and the recess portion.

5. The vehicle mirror device of claim 1, wherein an overlap amount of the protrusion portion and the recess portion in the upper and lower direction when the protrusion portion and the recess portion are fitted is set larger than the second gap.

6. The vehicle mirror device of claim 2, wherein an overlap amount of the protrusion portion and the recess portion in the upper and lower direction when the protrusion portion and the recess portion are fitted is set larger than the second gap.

7. The vehicle mirror device of claim 3, wherein an overlap amount of the protrusion portion and the recess portion in the upper and lower direction when the protrusion portion and the recess portion are fitted is set larger than the second gap.

8. The vehicle mirror device of claim 1, wherein:
   the protrusion portion is configured to include a pair of protrusion portion sloping faces;
   the recess portion is configured to include a pair of recess portion sloping faces; and
   the pair of protrusion portion sloping faces and the pair of recess portion sloping faces are formed such that boundary portions which are between the recess portion sloping faces and the opposing face make contact with the protrusion portion sloping faces respectively when the recess portion is fitted with the protrusion portion.

9. The vehicle mirror device of claim 2, wherein the pair of protrusion portion sloping faces and the pair of recess portion sloping faces are formed such that boundary portions which are between the recess portion sloping faces and the opposing face make contact with the protrusion portion sloping faces respectively when the recess portion is fitted with the protrusion portion.

10. The vehicle mirror device of claim 1, wherein:
    the protrusion portion is configured to include a pair of protrusion portion sloping faces;
    the recess portion is configured to include a pair of recess portion sloping faces; and
    a dimension between boundary portions which are between the pair of recess portion sloped faces and the opposing face is set smaller than a dimension between boundary portions which are between the pair of protrusion portion sloping faces and the orthogonal face.

11. The vehicle minor device of claim 2, wherein a dimension between boundary portions which are between the pair of recess portion sloped faces and the opposing face is set smaller than a dimension between boundary portions which are between the pair of protrusion portion sloping faces and the orthogonal face.

* * * * *